United States Patent
Park et al.

(10) Patent No.: US 10,053,749 B2
(45) Date of Patent: Aug. 21, 2018

(54) PRODUCTION METHOD FOR PLATED STEEL SHEET USING A STEEL SHEET ANNEALING DEVICE

(71) Applicant: POSCO, Pohang (KR)

(72) Inventors: Rho-Bum Park, Gwangyang (KR); Kwang-Geun Chin, Gwangyang (KR); Man-Young Park, Gwangyang (KR)

(73) Assignee: POSCO, Pohang-si (KR)

( * ) Notice: Subject to any disclaimer, the term of this patent is extended or adjusted under 35 U.S.C. 154(b) by 307 days.

(21) Appl. No.: 14/971,258

(22) Filed: Dec. 16, 2015

(65) Prior Publication Data

US 2016/0102381 A1 Apr. 14, 2016

Related U.S. Application Data

(62) Division of application No. 13/141,798, filed as application No. PCT/KR2009/007326 on Dec. 8, 2009.

(30) Foreign Application Priority Data

Dec. 26, 2008 (KR) .................. 10-2008-0134884

(51) Int. Cl.
*C21D 8/02* (2006.01)
*C23C 12/02* (2006.01)
(Continued)

(52) U.S. Cl.
CPC .............. *C21D 9/46* (2013.01); *C21D 1/26* (2013.01); *C21D 1/34* (2013.01); *C21D 1/42* (2013.01);
(Continued)

(58) Field of Classification Search
CPC . C21D 9/46; C21D 9/126; C21D 9/34; C21D 9/42; C21D 9/613; C21D 9/84; C23C 2/06; C23C 2/12; C23C 2/26; C23C 2/28
See application file for complete search history.

(56) References Cited

U.S. PATENT DOCUMENTS

| | | | |
|---|---|---|---|
| 4,398,700 A | 8/1983 | Thome | |
| 5,137,586 A | 8/1992 | Klink | |

(Continued)

FOREIGN PATENT DOCUMENTS

| | | | |
|---|---|---|---|
| CA | 1255897 A | 6/1989 | |
| CN | 86104502 A | 2/1987 | |

(Continued)

OTHER PUBLICATIONS

Translation of JP 51-136529, Nov. 26, 1976.*

(Continued)

*Primary Examiner* — C Melissa Koslow
(74) *Attorney, Agent, or Firm* — The Webb Law Firm

(57) ABSTRACT

Provided is a method for producing plated steel sheet by means of an annealing device which includes at least one section and in which the at least one section is filled with a gas constituting a non-reducing atmosphere or a weakly reducing atmosphere to substantially improve the quality of plating onto hot-dipped steel sheet, including the plating properties, alloying properties, anti-pickup properties, plating adhesion properties, anti-flaking properties, anti-cratering properties and anti-ash properties, by using prior-art annealing equipment and heat-treatment cycle without any additional oxidation-reduction heat treatment process or large quantities of high-cost alloying elements.

4 Claims, 6 Drawing Sheets

(51) Int. Cl.

| | | |
|---|---|---|
| *C21D 9/46* | (2006.01) | |
| *C21D 1/26* | (2006.01) | |
| *C21D 9/00* | (2006.01) | |
| *C21D 9/54* | (2006.01) | |
| *C23C 2/02* | (2006.01) | |
| *C23C 2/26* | (2006.01) | |
| *C23C 2/28* | (2006.01) | |
| *C23C 26/00* | (2006.01) | |
| *C21D 1/34* | (2006.01) | |
| *C21D 1/42* | (2006.01) | |
| *C21D 1/613* | (2006.01) | |
| *C21D 1/84* | (2006.01) | |
| *C21D 6/00* | (2006.01) | |
| *C22C 38/02* | (2006.01) | |
| *C22C 38/04* | (2006.01) | |
| *C22C 38/60* | (2006.01) | |
| *C23C 2/06* | (2006.01) | |
| *C23C 2/12* | (2006.01) | |
| *C21D 1/00* | (2006.01) | |

(52) U.S. Cl.
CPC .............. *C21D 1/613* (2013.01); *C21D 1/84* (2013.01); *C21D 6/005* (2013.01); *C21D 6/008* (2013.01); *C21D 8/02* (2013.01); *C21D 9/005* (2013.01); *C21D 9/54* (2013.01); *C22C 38/02* (2013.01); *C22C 38/04* (2013.01); *C22C 38/60* (2013.01); *C23C 2/02* (2013.01); *C23C 2/06* (2013.01); *C23C 2/12* (2013.01); *C23C 2/26* (2013.01); *C23C 2/28* (2013.01); *C23C 26/00* (2013.01); *Y02P 10/253* (2015.11)

(56) References Cited

U.S. PATENT DOCUMENTS

| | | |
|---|---|---|
| 5,497,817 A | 3/1996 | Ikegami |
| 6,398,884 B1 | 6/2002 | Kyono et al. |
| 6,410,163 B1 | 6/2002 | Suzuki et al. |
| 6,673,470 B2 | 1/2004 | Shigekuni et al. |
| 7,067,023 B2 | 6/2006 | Kami et al. |
| 7,101,445 B2 | 9/2006 | Kami et al. |

FOREIGN PATENT DOCUMENTS

| | | | |
|---|---|---|---|
| CN | 1286730 A | | 3/2001 |
| CN | 1294637 A | | 5/2001 |
| CN | 1386140 A | | 12/2002 |
| CN | 1416478 A | | 5/2003 |
| EP | 1291448 A1 | | 3/2003 |
| EP | 1936000 | * | 6/2008 |
| JP | 51-136529 | * | 11/1976 |
| JP | 61-195965 | * | 8/1986 |
| JP | 6172953 A | | 6/1994 |
| JP | 6172954 A | | 6/1994 |
| JP | 7331403 A | | 12/1995 |
| JP | 08-92713 | * | 4/1996 |
| JP | 892713 A | | 4/1996 |
| JP | 08-170159 | * | 7/1996 |
| JP | 8170159 A | | 7/1996 |
| JP | 8291379 A | | 11/1996 |
| JP | 9263921 A | | 10/1997 |
| JP | 1112689 A | | 1/1999 |
| JP | 11323443 A | | 11/1999 |
| JP | 2001226742 A | | 8/2001 |
| JP | 2002146478 A | | 5/2002 |
| JP | 200396540 A | | 4/2003 |
| KR | 100286667 B1 | | 4/2001 |

OTHER PUBLICATIONS

Translation of JP 61-195965, Aug. 30, 1986.*
Translation of JP 08-170159, Jul. 2, 1996.*
Translation of JP 08-92713, Apr. 9, 1996.*

* cited by examiner (a)

(b)

(c)

(d)

PRODUCTION METHOD FOR PLATED STEEL SHEET USING A STEEL SHEET ANNEALING DEVICE

CROSS REFERENCE TO RELATED APPLICATIONS

This Application is a divisional of U.S. patent application Ser. No. 13/141,798 filed Dec. 8, 2009, which is the U.S. national phase of PCT Application PCT/KR2009/007326, filed Dec. 8, 2009, which claims priority to Korean Patent Application No. 10-2008-0134884 filed on Dec. 26, 2008, each of which is incorporated herein by reference in its entirety.

TECHNICAL FIELD

The present invention relates to a steel sheet annealing device for manufacturing a plated steel sheet such as a high strength hot-dip galvanized steel sheet and a galvannealed steel sheet, a plated steel sheet manufacturing apparatus including the same, and a plated steel sheet manufacturing method using the same. More particularly, the present invention relates to a steel sheet annealing device for manufacturing a hot-dip plated steel sheet such as a hot-dip galvanized steel sheet and a galvannealed steel sheet, a plated steel sheet manufacturing apparatus including the same, and a plated steel sheet manufacturing method using the same.

BACKGROUND ART

A recent environmental problem includes the issue concerning the fuel consumption efficiency of a vehicle, and, as environmental protection is becoming important, fuel consumption regulations for vehicles have been strengthened. As a scheme for improving fuel consumption efficiency, various methods for reducing the weight of a vehicle have been considered from various angles. A current trend is for steel manufacturers to attempt to manufacture a high strength steel to secure safety while reducing the weight of steel sheet used as a material of an automobile.

Recently, according to the current trend, the demand for a high strength hot dip galvanized steel sheet for an automobile is greatly increasing. In general, however, while a method of manufacturing high strength steel using a solid solution strengthening element such as P, Mn, or the like may go some way toward strengthening the steel and reducing the weight thereof, the method has a limitation in processing various forms of vehicle components.

Therefore, at the time of producing vehicle components, steel, which is able to be used for vehicle components having complicated forms through excellent processibility and to provide relatively high strength characteristics after the completion of the process, is required. As this sort of steel there is Advanced High Strength Steel (AHSS) such as dual phase steel (DP steel), transformation induced plasticity steel (TRIP steel), or the like. The AHSS may contain large quantities of elements such as Si, Mn, Al, and the like. Si is an element capable of maintaining ductility in steel without significantly reducing the strength thereof. Due to this reason, Si may be frequently used.

However, when Si as an alloying element of steel is added in an amount of approximately 0.1 wt % or more, a hot dip galvanized steel sheet manufactured through a general method may result in the occurrence of defects such as a bare spot or defects on an external part thereof occurring relatively easily. These defects are generated in an annealing process atmosphere as one of a plurality of processes for manufacturing the hot dip galvanized steel sheet. In the case of the annealing process, a heat treatment at a high temperature of approximately 800° C. is performed while maintaining a reduction atmosphere containing hydrogen of 5 vol % or more and nitrogen with regard to the remainder thereof (please refer to JP1999-323443 and U.S. Pat. No. 5,137,586). During the high temperature heat treatment process, Si may diffuse on the surface of the steel sheet. That is, the density of Si on the steel surface may be 10 to 100 times higher than an average density of Si in the entire steel sheet, and the surface of the steel sheet, enriched with Si, may react to moisture or impurities in an atmosphere of a furnace to form an $SiO_2$ oxide film.

The $SiO_2$ oxide film formed on the surface of the steel sheet in the process for manufacturing the hot dip galvanized steel sheet may seriously degrade a specific characteristic, the wettability of the steel sheet, such that it is therefore difficult to secure excellent wettability of the steel sheet, by which a bundle form of a bare spot effect occurs, or even when the plating process is properly undertaken on the surface thereof, the adhesion extent with regard to the plating state may become seriously degraded. That is, at the time of conversion processing the steel into components, the $SiO_2$ oxide film may be a factor of a plating peeling phenomenon in which a plating layer is detached.

For reference, surface enrichment due to Si, Mn, or the like may occur by the following reaction formula.

$$Fe_2O_3 + 3H_2 \rightarrow 2Fe + 3H_2O$$

$$Si + 2H_2O \rightarrow SiO_2 + 2H_2$$

$$Mn + H_2O \rightarrow MnO + H_2 \qquad \text{[Reaction Formula]}$$

(Here, $Fe_2O_3$:FeO, $Fe_3O_4$, $Fe(OH)_x$, O and other oxides)

In order to prevent defects from occurring due to the decrease in wettability of a high strength steel sheet due to Si, Mn, or the like, various techniques have been proposed, for example, there was provided the technique of increasing an amount of Al in the hot dip galvanizing bath to increase a production amount of a Zn—Fe—Al—Si based and Fe—Al—Si based alloying layer on an interface between Fe and an alloying layer. Since the alloying layer resolves an oxidized layer of an annoying element, a hot dip plating wettability decrease occurring due to the oxidized film of the alloying element on the interface can be suppressed. However, absolutely increasing the amount of Al within the plating bath may be undesirable, as the increase of Al may be a factor in intergranular corrosion, together with Pb inevitably added as an impurity to the plating bath at the time of manufacturing a mini-spangle steel sheet. The intergranular corrosion may cause the plating peeling, and moreover, since the increase of Al within the plating bath is not good for welding at the time of processing the steel sheet, the above-mentioned technique according to the related art actually has difficulties when practically applied.

In addition, according to another technique of the related art, in order to improve the wettability of Si-containing steel, there has been proposed a technique in which surplus air is introduced to a direct fired furnace to form an oxidized film, and then, a reduction process is performed in the heating furnace RTS of a 10 vol % $H_2$-90 vol % $H_2$ reduction atmosphere, to greatly increase wettability. As an example, when the thickness of an iron oxide may be increased by increasing the rate of air from the general rate of 0.9 to 1.05 in the direct fired furnace, and when a reduction heat treatment is performed therein, a pure iron layer is formed on the surface of a steel sheet; stabilized wettability can be secured. However, this technique according to the related art also has technical defects, that is, when the thickness of the oxidized film cannot be precisely controlled, plating peeling may occur due to the thickened film layer. To the contrary, since the oxidized film is thin and thus completely returned by the reduction process, Si is enriched intact on the surface of the steel sheet such that a zinc plating layer cannot be strongly adhered to the surface of the steel sheet or bare plating may occur thereon. Therefore, the thickness of the iron oxide should be precisely controlled in the direct fired furnace.

One of the above-mentioned techniques according to the related art regarding the oxidation-reduction heat treatment is disclosed in JP2001-226742. In this case, the oxidized film is formed with a thickness ranging from 0.02 μm to 1 μm during an oxidation heat process, and is then completely resolved during the reduction process, to secure the wettability thereof. In addition, in the cases of JP1994-172953 and JP1994-172954, an oxidized film retains a thickness ranging from 0.02 μm to 0.2 μm after the reduction heat treatment, but it is shown to be completely resolved by Al within the plating bath.

However, in the case of the above patent technologies with regard to the oxidation-reduction method, precisely controlling a composition of iron oxide formed at the time of oxidation heat treatment, and a thickness thereof, as well as a composition of iron oxidized film remaining after the reduction heat treatment, the porosity thereof, and the like is not easy. Therefore, a large difference in wettability is inevitable, according to working conditions or other external factors.

An aspect of the present invention provides a steel sheet annealing device for providing an advanced hot-dip plated steel sheet and a galvannealed steel sheet, a plated steel sheet manufacturing apparatus including the same, and a plated steel sheet manufacturing method using the same.

SUMMARY OF THE INVENTION

According to an aspect of the present invention, there is provided an annealing device including at least one section, the at least one section being filled with a gas constituting a non-reducing atmosphere or a weakly reducing atmosphere, and a plated steel sheet manufacturing apparatus including the same. In this case, the gas may be a weekly reducing gas containing nitrogen ($N_2$) of 100 vol %, or hydrogen ($H_2$) of 3 vol % or less and nitrogen ($N_2$) of 97 vol % or more. In addition, the annealing device may include at least one section among a preheating section, a heating section, a soaking section, a slow cooling section, a rapid cooling section, an overaging section, a re-heating section, and a final cooling section. Further, the gas may be filled in at least one section among the preheating section, the heating section, the soaking section, the slow cooling section, the rapid cooling section, the overaging section, the re-heating section, and the final cooling section.

According to another aspect of the present invention, there is provided a plated steel sheet manufacturing method including: performing a series of processes for manufacturing a hot-dip plated steel sheet or a galvannealed steel sheet by performing an annealing process in at least one section of an annealing device, the at least one section being filled with a gas constituting a non-reducing atmosphere or a weakly reducing atmosphere, and the annealing device including the at least one section. The at least one section may be classified according to a heat treatment or a cooling scheme, and further, a method of manufacturing a hot-dip plating material steel sheet produced in a continuous annealing line (CAL) having at least one section that contains a gas constituting a non-reducing atmosphere or a weekly reducing atmosphere, in the annealing device. In this case, the annealing process may be a series of processes including at least one of a pre heating operation, a heating operation, a soaking operation, a slow cooling operation, a rapid cooling operation, an overaging operation, a re-heating operation, and a final cooling operation. Further, the gas may be a nitrogen gas ($N_2$) of 100 vol %, or a gas containing hydrogen gas ($H_2$) of 3 vol % or less and nitrogen gas ($N_2$) of 97 vol % or more.

According to an embodiment of the present invention, the plating qualities of a hot dip plated steel sheet, such as wettability on a hot-dip plated steel sheet, including alloying reactivity, anti-pickup properties, plating adhesion properties, anti-flaking properties, anti-cratering properties and anti-ash properties, or the like, may be significantly improved. In addition, an excellent quality of hot dip plated steel sheet may be secured economically and easily such that the use thereof is varied and is effective in terms of a reduction in cost.

DESCRIPTION OF DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
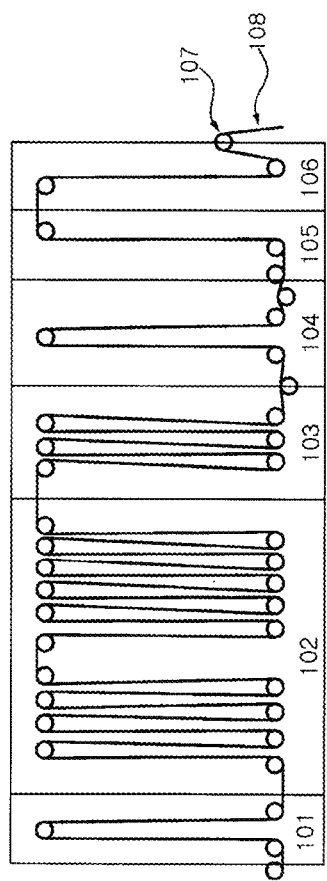
FIG. 1 illustrates a schematic cross-section of a continuous annealing line for continuously performing a continuous annealing process on steel sheets in a general annealing process.

Embodiments of the present invention will now be described in detail with reference to the accompanying drawings such that they could be easily practiced by those having skill in the art to which the present invention pertains. However, in describing the embodiments of the present invention, detailed descriptions of well-known functions or constructions will be omitted so as not to obscure the description of the present invention with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of other elements.

According to an embodiment of the present invention, a hot-dip plated steel sheet or a galvannealed steel sheet manufacturing apparatus and a process thereof, and a continuous annealing device and a process thereof for supplying a hot-dip plating material, or a hot-dip plating apparatus or a process therefor, are provided to anneal a steel sheet by technically controlling at least one section among a plurality of sections of an annealing device included in the above apparatus to maintain an interior atmosphere of the annealing device as a non-reducing atmosphere or a weekly reducing atmosphere. Hereinafter, embodiments of the present invention will be described in detail with reference to the accompanying drawings.

An annealing process in a hot-dip plating line and a continuous annealing line is widely well-known as a process to secure wettability by performing a heat treatment on a steel sheet to secure material properties and resolve the surface of the steel sheet The heat treatment performed on the steel sheet in a general annealing process is principally performed under a reduction atmosphere with hydrogen ($H_2$) of 5 vol % or more and nitrogen ($N_2$) with regard to the remainder thereof. That is, when the steel sheet continuously passes through a pre heating section 101 (PHS) to a final cooling section 106 (FCS) shown in FIG. 1, respective sections may be passed through a portion of or overall among a pre heating operation section 101, a heating operation section 102, a soaking operation section 103, a slow cooling operation section 104, a rapid cooling operation section 105 and a final cooling operation section 106, while being maintained as a reduction atmosphere. Through this series of operations, the steel sheet may be heated or cooled to implement a continuous annealing process according to each operation performed.

However, the inventors of the present invention have studied and found the fact that moisture was generated during a reduction of oxidized Fe under a reduction atmosphere in which the heat treatment of the annealing process was performed and the generated moisture reacted to Si, Mn, Al, B, and the like, added as an alloying element of steel. The alloying elements reacting to moisture formed an oxide film such as $SiO_2$, MnO, $MnO_2$, $Mn_2SiO_4$, $B_2O_3$, $Al_2O_3$, or the like, on a surface of the steel sheet. It was therefore found that the oxide film could significantly degrade plating properties or wettability with hot-dip zinc during the hot-dip galvanizing process.

Figure 5:
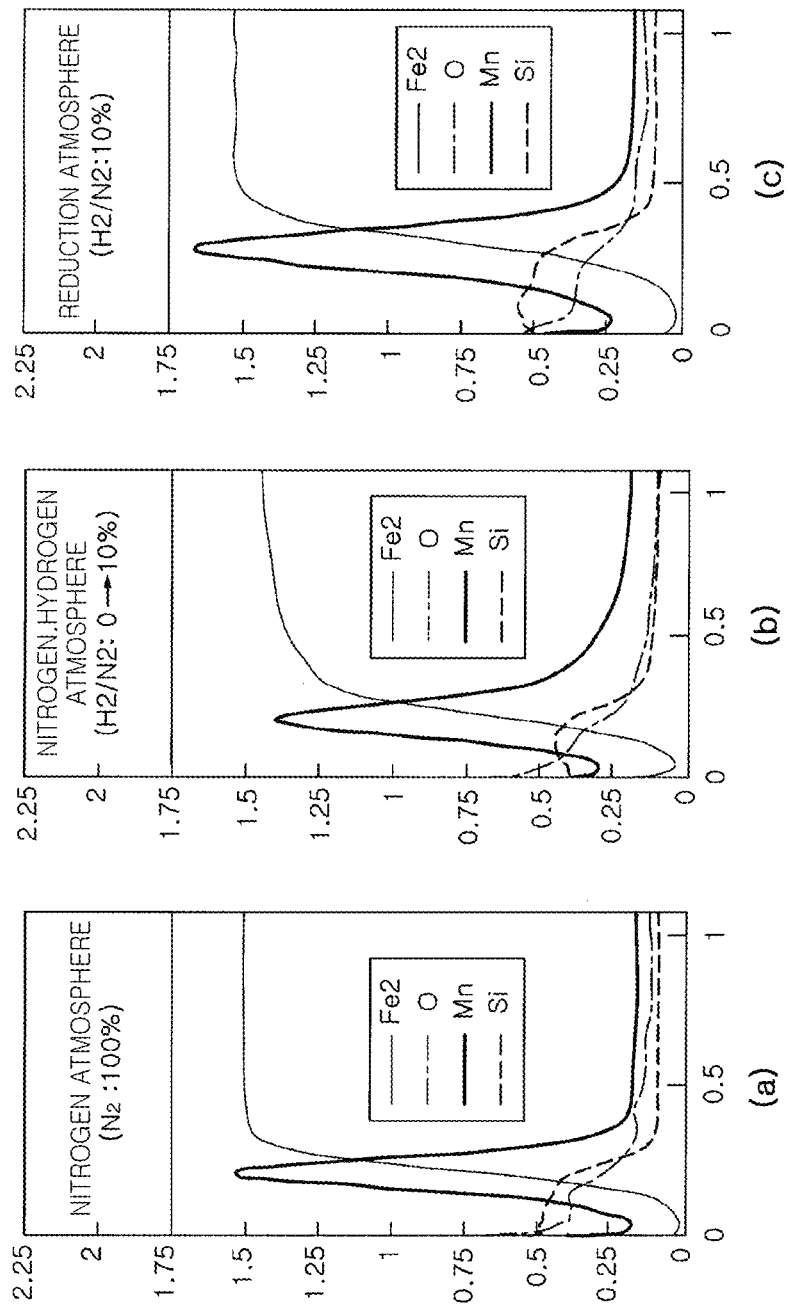
FIG. 5 shows graphs illustrating the diffusion extent of Si, Mn, Al, B, and the like, through an annealing process under a nitrogen atmosphere (a) and a nitrogen-hydrogen atmosphere (b) according to an embodiment of the present invention and under a reducing atmosphere (c) of a comparative example.
Figure 6:
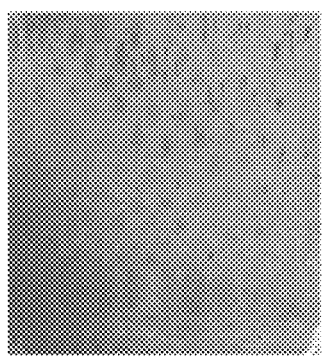
FIG. 6 shows photos for a comparison between surfaces a) and b) of a steel sheet processed according to an embodiment of the present invention and surfaces (c and d) of a steel sheet processed according to the related art.
Figure 6:
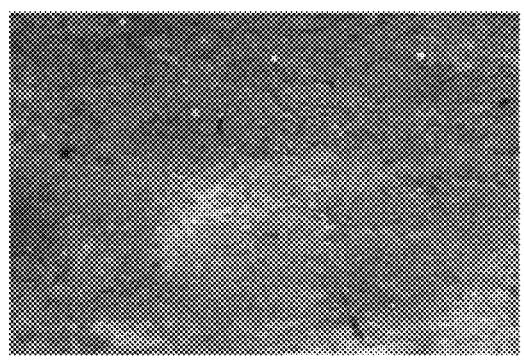
Figure 6:
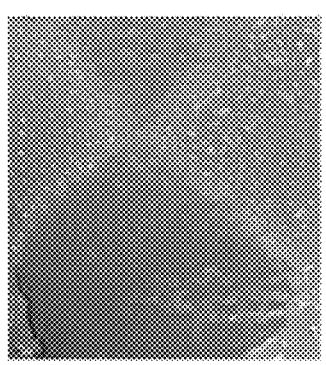
Figure 6:
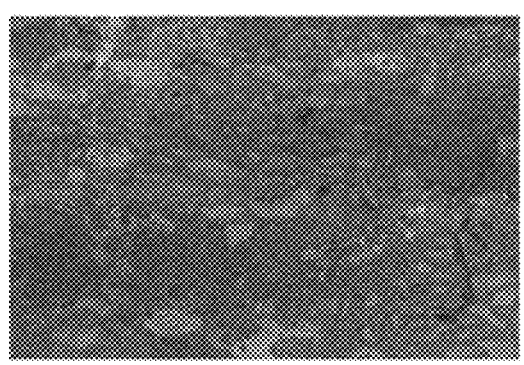

As a result, a general annealing process is performed to resolve an oxidized surface of a steel sheet and a pollutant material on the surface thereof such that wettability on the surface of steel sheet is improved as the purposes of the process, but it results in that under this hydrogen atmosphere, the annealing process diffuses strength oxidation elements such as Si, Mn, Al, B, and the like, existing in the interior of the steel sheet, toward far end surface of the steel sheet, with reference to FIGS. 5A, 5B and 5C. Further, as a density level of the alloying elements moved to the far end surface thereof is increased, it results in the oxidation on the surface of the steel sheet being accelerated. In this case, due to the oxide film formed on the far end surface, a reverse effect such as a decrease in wettability may be caused and there may be difficulties in attaining some level of satisfactory quality in the plated steel sheet as shown in FIGS. 6C and 6D.

Therefore, in a case in which a material undergoes a heat treatment in a series of processes and a device therefor, for performing the annealing process using the continuous hot-dip plating device and the continuous annealing device, the inventors of the present invention studied a case in which the heat treatment was performed by composing the entire or partial part of the interior of the annealing device to have a non-reducing atmosphere as shown in FIGS. 5A and 5B, and through this method, the study resulted in a situation in which a device and a method able to manufacture a plate steel sheet excellent in wettability were completed. An applicable steel sheet is not particularly limited, but may be one of a GI steel sheet (Zn-0.2% Al, hot-dip galvanized steel sheet), a GA steel sheet (Zn-0.2% Al, galvannealed steel sheet), a GL steel sheet (Zn-55% Al, a galvanium plated steel sheet), an AL steel sheet (Al-5% Si, an aluminum plated steel sheet) and an MG steel sheet (Zn-3% Mg-2% Al, a zinc-magnesium-based plated steel sheet).

That is, an experiment with regard to a method of manufacturing a steel sheet having excellent wettability was conducted by forming respective sections in the interior of the annealing device under various atmospheres. It proved by the experiment that when at the time of annealing, the atmosphere was composed as a non-reducing atmosphere containing a nitrogen gas ($N_2$) of 100 vol % or a weekly reducing atmosphere containing a hydrogen gas ($H_2$) of 3 vol % or less and a nitrogen gas ($N_2$) of 97 vol % or more, a plated steel sheet having relatively excellent wettability could be manufactured.

When a hydrogen concentration in the interior of the annealing device was maintained as 3 vol % or less, or as 0 vol %, a covering percentage of an oxide on the surface of the steel sheet was significantly reduced. When hydrogen concentration exceeds 3 vol % and nitrogen concentration is decreased to below 97 vol %, a covering percentage of an oxide on the surface of the steel sheet which has undergone the annealing process may be increased such that wettability may be decreased at the time of performing the hot-dip plating process.

Moreover, while the steel sheets are continuously passed through respective sections that are divided according to a heat treatment or a cooling scheme of the annealing device so as to undergo the heat treatment; a non-reducing atmosphere or a weekly reducing atmosphere may be applied to at least one section among the plurality of sections. Though applying the non-reducing atmosphere or the weekly reducing atmosphere to multiple sections may be excellent in terms of efficiency, it is also applicable that an extremely oxidized material steel sheet is annealed, or a partial application in consideration of work terms, for example, an oxidation atmosphere formation prevention in the interior of an annealing line, anti-ash properties, or the like, may be provided in at least one continuous or interrupted section provided to correspond to a plating process, the scale thereof, or the like.

It was proved by experimentation, that in the case of the annealing line shown in FIG. 1, the application in at least one section among the sections from the pre heating section 101 to the slow cooling section (SCS) 104 resulted in providing a more excellent result than that in the application in the rapid cooling section (RCS) 105 to the final cooling section 106.

Figure 3:
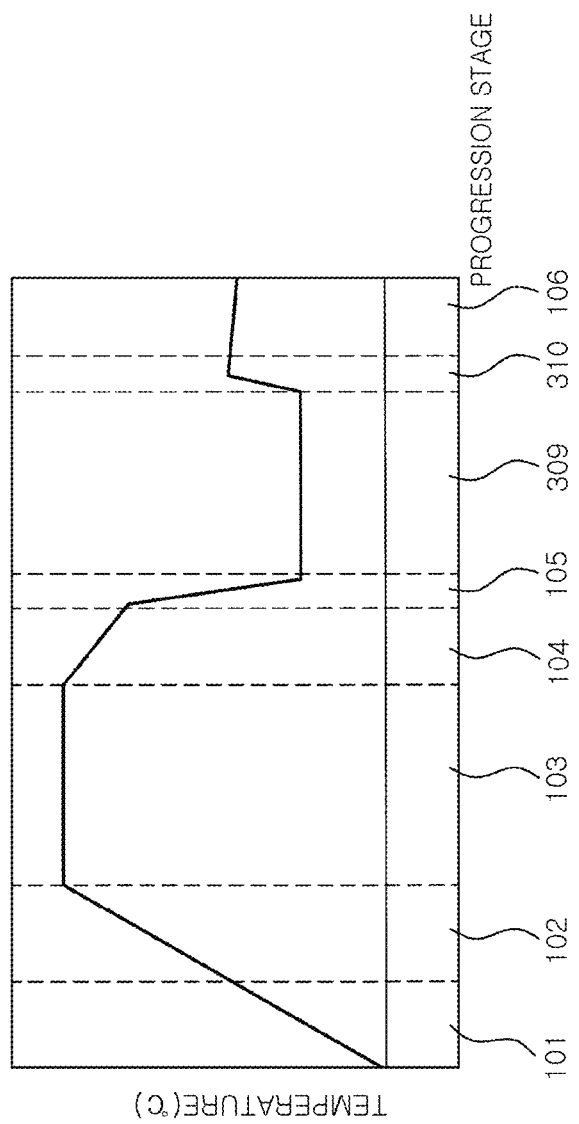
FIG. 3 is a graph showing a comparison of heat treatment cycles in the annealing process according to the related art and an embodiment of the present invention in detail.
Figure 4:
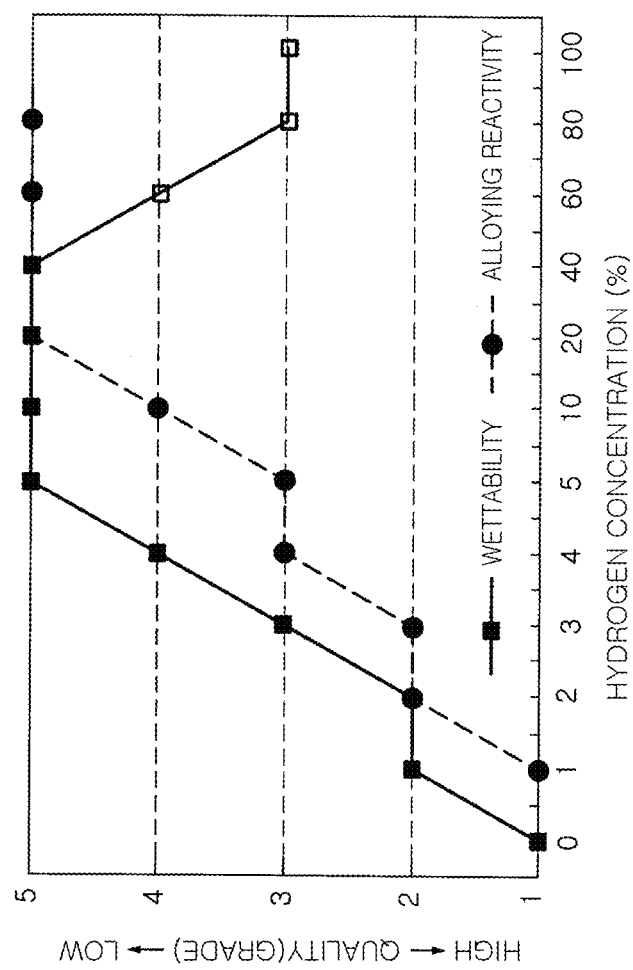
FIG. 4 is a graph showing evaluation results of plating quality effects according to a hydrogen gas concentration in the inside of an annealing device.

Furthermore, in addition to the general continuous annealing line shown in FIG. 1, in the process which further includes the overaging section (OAS) (309), the re-heating section (RHS) 310, or other kind of a section having a heating function, a maintenance function and a cooling function between the rapid cooling section 105 and the final cooling section 106 shown in FIG. 3; the application may be also provided.

In addition, heating, maintenance and cooling devices and methods may be different from one another according to respective sections of the continuous annealing line, and if necessary, an additional section may be more provided, but there is no big difference. That is, the non reducing or weekly reducing atmosphere may be applied to an additional section not shown in FIG. 1, and may be also applied to an annealing line from which a portion of six sections shown in FIG. 1 is excluded.

As a heating device such as the pre heating section 101, the heating section (HS) 102, the re-heating section 310, and the like; an induction heater, an infrared heater, a radiant tube burner, an ultrasonic wave burner, or any other kinds of heating devices may be used or a device having a combination thereof may be used. Further, as a cooling material used for the slow cooling section 104, the rapid cooling section 105, the final cooling section 106, or the line; any other materials, for example, nitrogen, liquid nitrogen, and nitrogen containing hydrogen, or the like, may be used, and in addition, a mixed cooling scheme including at least one thereof may be used.

Hereinafter, embodiments of the present invention will be described in detail.

First Embodiment

A full hard steel sheet (F/H) with a thickness of 1.0 mm and a tensile strength of 590 MPa grade TRIP (Containing Si of 1.5%, Mn of 1.6%, C of 0.08%, Sb of 0.02%, or the like, as a main alloying element) was subjected to a heat treatment process in an annealing device that including the section of FIG. 1. Some specimens were manufactured as a galvannealed steel sheet through a galvannealed process.

At this time, the annealing condition changed hydrogen, nitrogen and dewpoint atmosphere gases, and a heat treatment cycle was first provided under the condition of a pre heating-heating-soaking-slow cooling-rapid cooling-final cooling cycle (hereinafter, referred to as 'cycle A') shown in FIG. 2, but with regard to Inventive example 5, Inventive example 5 was performed under the conditions of a pre heating-heating-soaking-slow cooling-rapid cooling-overaging-reheating-final cooling cycle (hereinafter, referred to as 'cycle B') shown in FIG. 3.

A portion in the specimens completed in the annealing process was evaluated with regard to anti-pickup properties, and with regard to the remainder, a galvannealing process was performed to evaluate wettability and alloying reactivity according to respective annealing conditions, and the results were represented in the following Table 1 and Table 4.

TABLE 1

| | Classification | | | | | | |
|---|---|---|---|---|---|---|---|
| | Annealing Conditions | | | | Plating Quality | | |
| | Hydrogen | Nitrogen | Dewpoint | cycle | *Wettability | **Alloying Reactivity | ***Antipickup |
| Inventive example 1 | 0% | 100% | −30° C. | A | 1 | 1 | 1 |
| Inventive example 2 | 1% | 99% | −30° C. | A | 2 | 1 | 1 |
| Inventive example 3 | 2% | 98% | −30° C. | A | 2 | 2 | 1 |
| Inventive example 4 | 3% | 97% | −30° C. | A | 3 | 2 | 2 |
| Comparative Example 1 | 4% | 96% | −30° C. | A | 4 | 3 | 3 |
| Comparative Example 2 | 5% | 95% | −30° C. | A | 5 | 3 | 3 |
| Comparative Example 3 | 10% | 90% | −30° C. | A | 5 | 4 | 4 |
| Comparative Example 4 | 20% | 80% | −30° C. | A | 5 | 5 | 4 |
| Comparative Example 5 | 40% | 60% | −30° C. | A | 5 | 5 | 4 |
| Comparative Example 6 | 60% | 40% | −30° C. | A | 4 | 5 | 5 |
| Comparative Example 7 | 80% | 20% | −30° C. | A | 3 | 5 | 5 |
| Comparative Example 8 | 100% | 0% | −30° C. | A | 3 | 5 | 5 |

TABLE 1-continued

|  | Classification | | | | | | |
| --- | --- | --- | --- | --- | --- | --- | --- |
|  | Annealing Conditions | | | | Plating Quality | | |
|  | Hydrogen | Nitrogen | Dew-point | cycle | *Wettability | **Alloying Reactivity | ***Anti-pickup |
| Inventive example 5 | 0% | 100% | −30° C. | B | 1 | 1 | 1 |
| Inventive example 6 | 0% | 100% | −10° C. | A | 1 | 1 | 1 |
| Inventive example 7 | 0% | 100% | −50° C. | A | 1 | 1 | 2 |

(% of gas is vol %, equally applied below)

In the case of the present embodiment, a method and a criterion of evaluating a plating quality (wettability, alloying reactivity and anti-pickup properties) are as follows.

*Wettability: A hot-dip plating material has the properties of being easily plated on a steel sheet. In the present embodiment, an outer appearance of a plated steel sheet was observed by the naked eye and the evaluation criterion is as follows.

Grade 1: No occurrence of bare spot, level for use of automobile outer panel
Grade 2: Extremely small bare spot observed, level for use of automobile inner panel
Grade 3: Small bare spot observed, General level except an automobile
Grade 4: Moderate bare spot observed, Unavailable as product
Grade 5: Large bare spot observed, Unavailable as product

**Alloying reactivity: When a hot dip galvanized steel sheet was rapidly re-heated, a base material, Fe, was diffused to a zinc plating layer in such extent that an Fe—Zn alloying plated layer was uniformly formed. In the present embodiment, an outer appearance of a plated steel sheet was observed by the naked eye and the evaluation criterion is as follows.

Grade 1: Considerably even alloying surface layer, level for use of automobile outer panel
Grade 2: Even alloying surface layer, level for use of automobile inner panel
Grade 3: Comparatively even alloying surface layer, General level except an automobile
Grade 4: Comparatively uneven alloying surface layer, Unavailable as product
Grade 5: Uneven alloying surface layer, Unavailable as product

***Anti-pickup: The anti-pickup properties are to prevent an annealed oxide from being picked up on a hearth roll surface of an annealing device. While a steel sheet is heat treated at a relatively high temperature in the annealing device, Si, Mn, Al, and the like as steel components are diffused to the surface of the steel sheet to form the annealed oxide, and when the annealed oxide is picked up by the hearth roll surface, a defect such as a dent may be caused. Therefore, the anti-pickup properties are excellent when a covering percentage of the annealed oxide diffusion-formed on the steel sheet surface is smaller. In the case of the covering percentage of the annealed oxide, a surface of a specimen completed in the annealing process was photographed 30,000 times by using a field emission-SEM, and the covering percentage was then represented using an image analyzer. In addition, a thickness of an annealed oxide film was also measured using a glow discharge spectrometer (GDS) for reference of the present evaluation.

The evaluation criterion was as follows.

Grade 1: Annealed oxide film covering percentage of 5% or less
Grade 2: Annealed oxide film covering percentage of 20% or less
Grade 3: Annealed oxide film covering percentage of 35% or less
Grade 4: Annealed oxide film covering percentage of 45% or less
Grade 5: Annealed oxide film covering percentage of 45% or more As shown in the above Table 1, Inventive examples 1 to 7 according to the conditions of the present invention were all recorded as Grades 1 to 3 in the plating quality and represented the quality sufficient to be used as a product.

These results are also shown in FIGS. 7A and 7B. In particular, a relatively excellent plating quality was represented in a state in which hydrogen was not contained at all in the equal manner to Inventive example 1.

In addition, when hydrogen is not contained, it may be more satisfied, but a production is producible even up to a level of 3 vol % of hydrogen. Further, if a gas atmosphere was satisfied, in a case in which a heat treatment cycle was varied into a cycle form of FIG. 3 and experimented as Inventive example 5, or in a case in which a dewpoint was diversely varied to −10° C. and −50° C. and experimented as Inventive examples 6 and 7; in these cases, an excellent plating quality was also represented. Therefore, it could be appreciated that the satisfactory effect could be obtained by controlling a gas atmosphere even due to other external factors.

Meanwhile, in the case of comparative examples 1 to 8, an unsatisfactory plating quality of Grade 4 or 5 was represented in at least one quality property among wettability, alloying reactivity and anti-pickup properties. In particular, in a case in which a hydrogen concentration is considerably high, such as a level of 20 vol % or more, a low wettability was represented as up to Grade 3 as the hydrogen concentration increased, but the alloying reactivity and the anti-pickup properties were significantly decreased. Therefore, a distinct quality improvement effect could not be expected.

Second Embodiment

Figure 2:
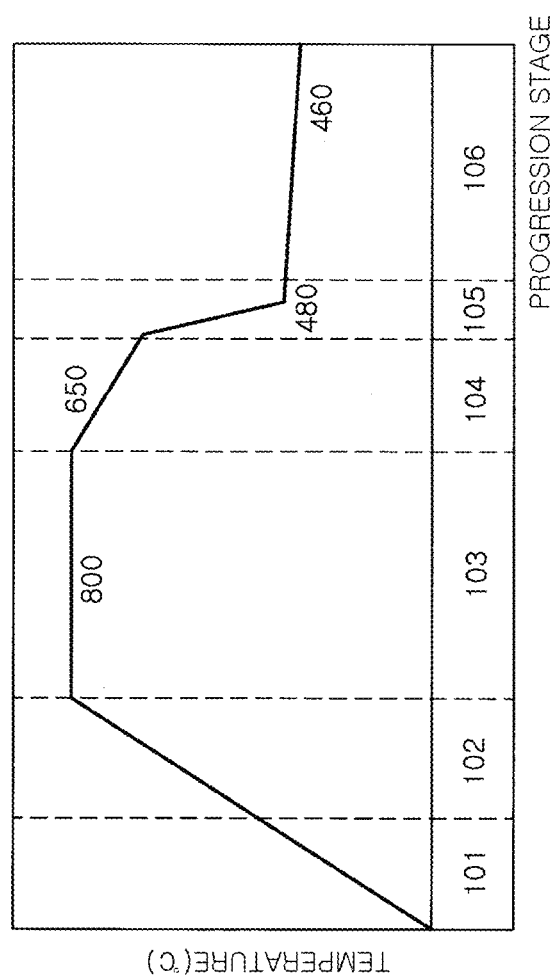
FIG. 2 is a graph showing the comparison of heat treatment cycles in an annealing process according to the related art and an embodiment of the present invention.

A full hard steel sheet (F/H) material having a thickness of 1.0 mm and a TRIP (Containing Si of 1.5%, Mn of 1.6%, C of 0.08%, Sb of 0.02%, or the like, as a main alloying element) was subjected to an annealing process in a heat treatment cycle shown in FIG. 2. In particular, in the present embodiment, an optional section was selected from six annealing sections shown in FIG. 1, and only a corresponding section was filled with a non reducing atmosphere of nitrogen gas of 100 vol % and a dewpoint of −30° C. and then a heat treatment was performed thereupon. A galvannealing process was performed on the heat treated steel sheet to evaluate wettability, alloying reactivity, and anti-pickup properties, and the results were shown in Inventive examples 8 to 12 of the following Table 2.

In addition, in order to determine whether the method according to the embodiment of the present invention is applicable according to materials and a plating condition, the annealing section of FIG. 1 was filled with a non reducing atmosphere gas of nitrogen of 100 vol % and a dewpoint of −30° C., and in this state, a heat treatment was performed while varying a steel type, a type of a material and a kind of plating bath, and then, a galvannealing process was performed to evaluate wettability, alloying reactivity, and anti-pickup properties, and the results were shown in Inventive examples 13 to 21 of the following Table 2.

In addition, in Comparative examples 9 to 15, an entire section of a form of an annealing device the same as that of FIG. 1 was filled with an atmosphere containing hydrogen of 5 vol %, and annealing and plating processes were performed. Respective results were shown in the following Table 2.

TABLE 2

| | Classification | | | | Plating Quality**** | | |
|---|---|---|---|---|---|---|---|
| | Annealing Device Non-reducing atmosphere Application Section (FIG. 1 Basis) | Material Steel Type* | Kind** | Plating Bath Kind*** | Wettability | Alloying Reactivity | Anti-pickup |
| Inventive example 8 | 101~104 | TRIP | F/H | GA | 2 | 1 | 1 |
| Inventive example 9 | 102~105 | TRIP | F/H | GA | 2 | 1 | 1 |
| Inventive example 10 | 101~103,106 | TRIP | F/H | GA | 2 | 1 | 1 |
| Inventive example 11 | 102, 103 | TRIP | F/H | GA | 2 | 2 | 1 |
| Inventive example 12 | 102 | TRIP | F/H | GA | 3 | 2 | 2 |
| Inventive example13 | 101~106 | TRIP | CR | GA | 1 | 1 | 1 |
| Inventive example 14 | 101~106 | TRIP | HR | GA | 2 | 2 | 1 |
| Inventive example 15 | 101~106 | TWIP | F/H | GA | 3 | 2 | 3 |
| Inventive example 16 | 101~106 | DP | F/H | GA | 1 | 1 | 1 |
| Inventive example 17 | 101~106 | DQ | F/H | GA | 1 | 1 | 1 |
| Inventive example 18 | 101~106 | TRIP | F/H | GI | 1 | — | 1 |
| Inventive example 19 | 101~106 | DQ | F/H | GL | 1 | — | 1 |
| Inventive example 20 | 101~106 | DQ | F/H | AL | 2 | — | 1 |
| Inventive example 21 | 101~106 | DQ | F/H | MG | 3 | — | 1 |
| Comparative Example 9 | Non-application of non reducing atmosphere (nitrogen-5vol % hyodrogen) | TRIP | CR | GA | 4 | 3 | 2 |
| Comparative Example 10 | | TRIP | HR | GA | 5 | 5 | 3 |
| Comparative Example 11 | | TWIP | F/H | GA | 5 | 5 | 5 |
| Comparative Example 12 | | DP | F/H | GA | 4 | 4 | 5 |
| Comparative Example 13 | | TRIP | F/H | GI | 5 | — | 3 |
| Comparative Example 14 | | DQ | F/H | GL | 3 | — | 1 |
| Comparative Example 15 | | DQ | F/H | AL | 4 | — | 1 |
| Comparative Example 16 | | DQ | F/H | MG | 5 | — | 1 |

*A symbol for a steel type denotes a tensile strength 980 MPa-grade high manganese steel (Twin Induced Plasticity, TWIP), 780 MPa-grade heteroplasm steel (Dual Phase, DP), and 300 MPa-grade steel sheet for processing (Drawing Quality: DQ).
**Kind of a material denotes full hard steel sheets (F/H), cold rolled steel sheets (CR) and hot rolled steel sheets (HR).
***Kind of a plating bath indicates that respective annealing and plating processes were performed on GI(Zn—0.2% Al), GL(Zn—55% Al), AL(Al—5% Si) and Zn—3% Mg—2% Al).
****In the present embodiment, a method and a criterion of evaluating a plating quality were the same as that of the first embodiment.

In analyzing the result shown in the above Table 2, Inventive examples 8 to 12 in which the non reducing atmosphere according to the embodiment of the present invention was applied and the heat treatment was performed in at least one section among the plurality of sections, were shown to have excellent wettability, alloying activity and anti-pickup properties in the range of respective grades 1 to 3.

Further, Inventive example 8 in which a relatively large amount of sections having a non reducing atmosphere applied thereto were provided, was shown as providing a more excellent plating quality than Inventive example 12, in which a relatively small quantity of sections were provided. In addition, in comparison with a case of being applied to a cooling processing section, a case in which at least one section among sections 101 to 104 performing a heat processing was selected and applied, was shown to have a minute level but more excellent plating qualities.

Furthermore, when the kind of material was varied from existing F/H to a cold rolled steel sheet (CR) and a hot rolled steel sheet (HR), the plating quality was more improved (Inventive examples 13 and 14), meanwhile, in a reducing atmosphere according to the related art, a degraded plating quality of grade 4 or lower was shown from at least one quality property among plating qualities (Comparative examples 9 and 10).

Even in a case in which respective kinds were varied to TWIP, DP and DQ, an excellent plating quality was shown as being within respective grades 3 by being passed through processes according to the embodiment of the present invention (Inventive examples 15 to 17), meanwhile, in a reducing atmosphere according to the related art, a relatively degraded plating quality as compared to a quality property according to the embodiment of the present invention was represented from at least one quality property among plating qualities (Comparative examples 11 and 12).

Further, a case in which a GI material was manufactured using a TRIP steel material was also shown to have an excellent plating quality as in all grades 1 in the embodiment of the present invention (Inventive example 18), meanwhile, in a reducing atmosphere according to the related art, a plating quality was shown as grade 5 with regard to wettability, and was significantly degraded as compared to that of the embodiment of the present invention (Comparative example 13). Further, in a case in which a plating bath was varied to respective GL, AL and MG by using a DQ steel material (Inventive examples 19 to 21 and Comparative examples 14 to 16), the plating quality was excellent as respective grades 1 to 3 according to the embodiment of the present invention, meanwhile, in a reducing atmosphere according to the related art, a relatively degraded plating quality as compared to a quality property according to the embodiment of the present invention was shown from at least one quality property among plating qualities.

While the present invention has been shown and described in connection with the embodiments, it will be apparent to those skilled in the art that modifications and variations can be made without departing from the spirit and scope of the invention as defined by the appended claims.

The invention claimed is:

1. A plated steel sheet manufacturing method including:
   an annealing process for annealing a steel sheet by supplying a non-reducing atmospheric gas from the start of the annealing process to the end of the annealing process, and
   a plating process for plating the annealed steel sheet,
   wherein the non-reducing atmospheric gas contains nitrogen ($N_2$) of 100 vol % and has a dew-point temperature of −30° C. to −10° C.

2. The method of claim 1, wherein the annealing process includes at least one operation selected from the group consisting of pre heating, heating, soaking, slow cooling, rapid cooling, and final cooling.

3. The method of claim 2, wherein the annealing process further includes at least one of overaging and re-heating operations.

4. The method of claim 1, wherein the plated steel sheet is one of a hot-dip galvanized steel sheet, a galvannealed steel sheet, a galvanium plated steel sheet, an aluminum plated steel sheet and a zinc-magnesium-based plated steel sheet.

* * * * *